US012578994B2

(12) United States Patent
Kannan et al.

(10) Patent No.: US 12,578,994 B2
(45) Date of Patent: Mar. 17, 2026

(54) SYSTEMS AND METHODS FOR TRANSITIONING COMPUTING DEVICES BETWEEN OPERATING STATES

(71) Applicant: Apple Inc., Cupertino, CA (US)

(72) Inventors: Arun Kannan, Mountain View, CA (US); Manjunath M. Venkatesh, Cupertino, CA (US); Venu M. Duggineni, Cupertino, CA (US); Alhad A. Palkar, Cupertino, CA (US); Kaushik Raghunath, Cupertino, CA (US); David M. Jun, Cupertino, CA (US); Alex Tukh, Cupertino, CA (US); Yakov Ben-Zaken, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 463 days.

(21) Appl. No.: 18/113,589

(22) Filed: Feb. 23, 2023

(65) Prior Publication Data

US 2023/0273817 A1 Aug. 31, 2023

Related U.S. Application Data

(60) Provisional application No. 63/314,291, filed on Feb. 25, 2022.

(51) Int. Cl.
*G06F 9/48* (2006.01)

(52) U.S. Cl.
CPC .................................. *G06F 9/4881* (2013.01)

(58) Field of Classification Search
CPC .................................................... G06F 9/4881
See application file for complete search history.

(56) References Cited

U.S. PATENT DOCUMENTS

| | | | |
|---|---|---|---|
| 2008/0196107 A1 | 8/2008 | Yip et al. | |
| 2016/0188324 A1* | 6/2016 | Sankaranarasimhan ..................... G06F 21/6227 717/121 |
| 2019/0347408 A1* | 11/2019 | Regner ............... G06F 11/0721 |
| 2021/0250201 A1* | 8/2021 | O'Shea ............. H04L 12/40084 |
| 2021/0326430 A1 | 10/2021 | Coimbra et al. | |
| 2024/0256399 A1* | 8/2024 | Raspudic ............ G06F 16/1844 |

OTHER PUBLICATIONS

European Office Action from European Patent Application No. 23158501.9, dated May 27, 2024, 6 pages.
Extended European Search Report from European Patent Application No. 23158501.9, dated Jun. 5, 2023, 9 pages.

* cited by examiner

*Primary Examiner* — Sisley N Kim
(74) *Attorney, Agent, or Firm* — BAKERHOSTETLER

(57) ABSTRACT

A request to transition a computing system from a first state to a second state is received, and a respective manifest is compiled for each of a plurality of processors of the computing system. Each manifest comprises a transition identifier representing a command to transition from the first state to the second state and an action time for executing one or more operations associated with the transition identifier. The respective manifests are dispatched to the plurality of processors, and status reports are received from the plurality of processors regarding the transition from the first state to the second state.

25 Claims, 18 Drawing Sheets

200

INITIALIZE MANIFEST SERVER — 210

RECEIVE REQUEST TO TRANSITION COMPUTING SYSTEM
FROM FIRST STATE TO SECOND STATE — 220

NOTIFY PROCESSORS ABOUT TRANSITION REQUEST — 230

COUPLE MANIFESTS — 240

DISPATCH MANIFESTS TO PROCESSORS — 250

RECEIVE STATUS REPORTS FROM PROCESSORS — 260

500

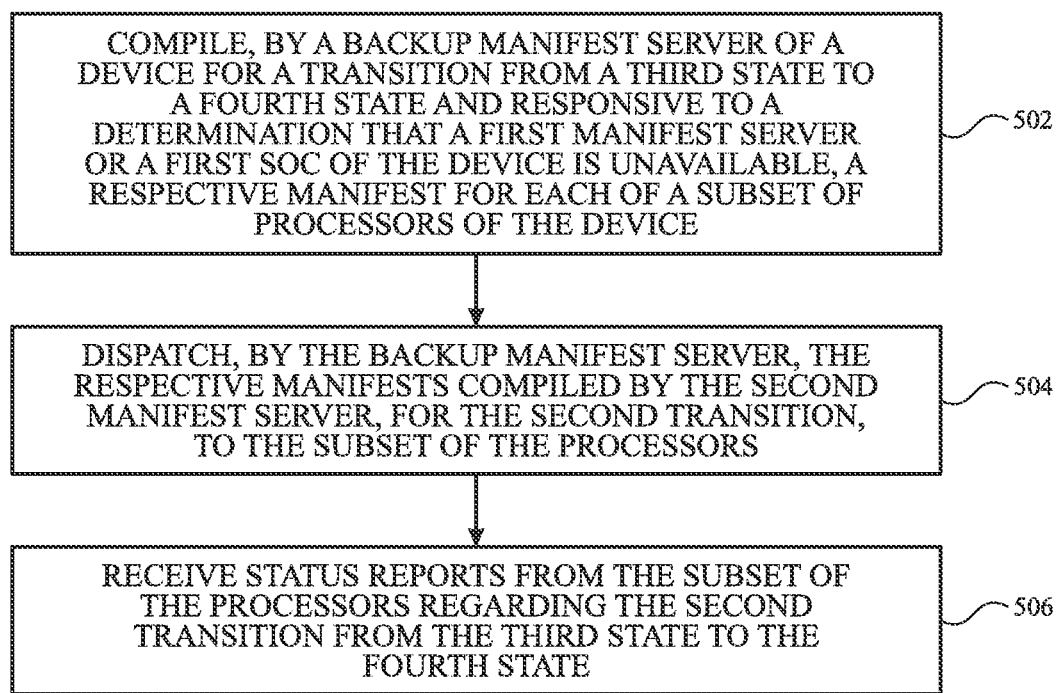

COMPILE, BY A BACKUP MANIFEST SERVER OF A
DEVICE FOR A TRANSITION FROM A THIRD STATE TO
A FOURTH STATE AND RESPONSIVE TO A
DETERMINATION THAT A FIRST MANIFEST SERVER
OR A FIRST SOC OF THE DEVICE IS UNAVAILABLE, A
RESPECTIVE MANIFEST FOR EACH OF A SUBSET OF
PROCESSORS OF THE DEVICE                                        502

DISPATCH, BY THE BACKUP MANIFEST SERVER, THE
RESPECTIVE MANIFESTS COMPILED BY THE SECOND
MANIFEST SERVER, FOR THE SECOND TRANSITION,
TO THE SUBSET OF THE PROCESSORS                                504

RECEIVE STATUS REPORTS FROM THE SUBSET OF
THE PROCESSORS REGARDING THE SECOND
TRANSITION FROM THE THIRD STATE TO THE
FOURTH STATE                                                   506

*FIG. 5*

[9] CHECK IF REGISTERED

[10] YES/NO

IF NO : WAIT FOR XMS AND RETRY UNTIL TIMEOUT

[11] SCHEDULE TRANSITION (TRANSITION_ID)

CHECK FOR PENDING MANIFEST

[12] PREPARE MANIFEST (TRANSITION_ID, TRANSACTION_NONCE)

PREPARE TO EXECUTE A MANIFEST

[13] RETURN: SUCCESS/FAILURE

[14] PREPARE MANIFEST (TRANSITION_ID, TRANSACTION_NONCE)

[19] RETURN: SUCCESS/FAILURE

SYSTEMS AND METHODS FOR TRANSITIONING COMPUTING DEVICES BETWEEN OPERATING STATES

CROSS REFERENCE TO RELATED APPLICATIONS

This application claims the benefit of priority to U.S. Provisional Patent Application No. 63/314,291, entitled, "Systems and Methods for Transitioning Computing Devices Between Operating States", filed on Feb. 25, 2022, the disclosure of which is hereby incorporated herein in its entirety.

TECHNICAL FIELD

The present description relates generally to computing devices including, for example, systems and methods for transitioning computing devices between operating states.

BACKGROUND

Computing systems made up of one or more computing devices such as head-mountable devices typically have multiple processes being managed by multiple processors. The multiple processes function together to create a user experience.

BRIEF DESCRIPTION OF THE DRAWINGS

Certain features of the subject technology are set forth in the appended claims. However, for purpose of explanation, several embodiments of the subject technology are set forth in the following figures.

FIG. 5 is a flowchart illustrating an example process for controlling, by a backup manifest server, the timing of a subset of processors performing operations to change an operating state of a computing device according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

Figure 1A:
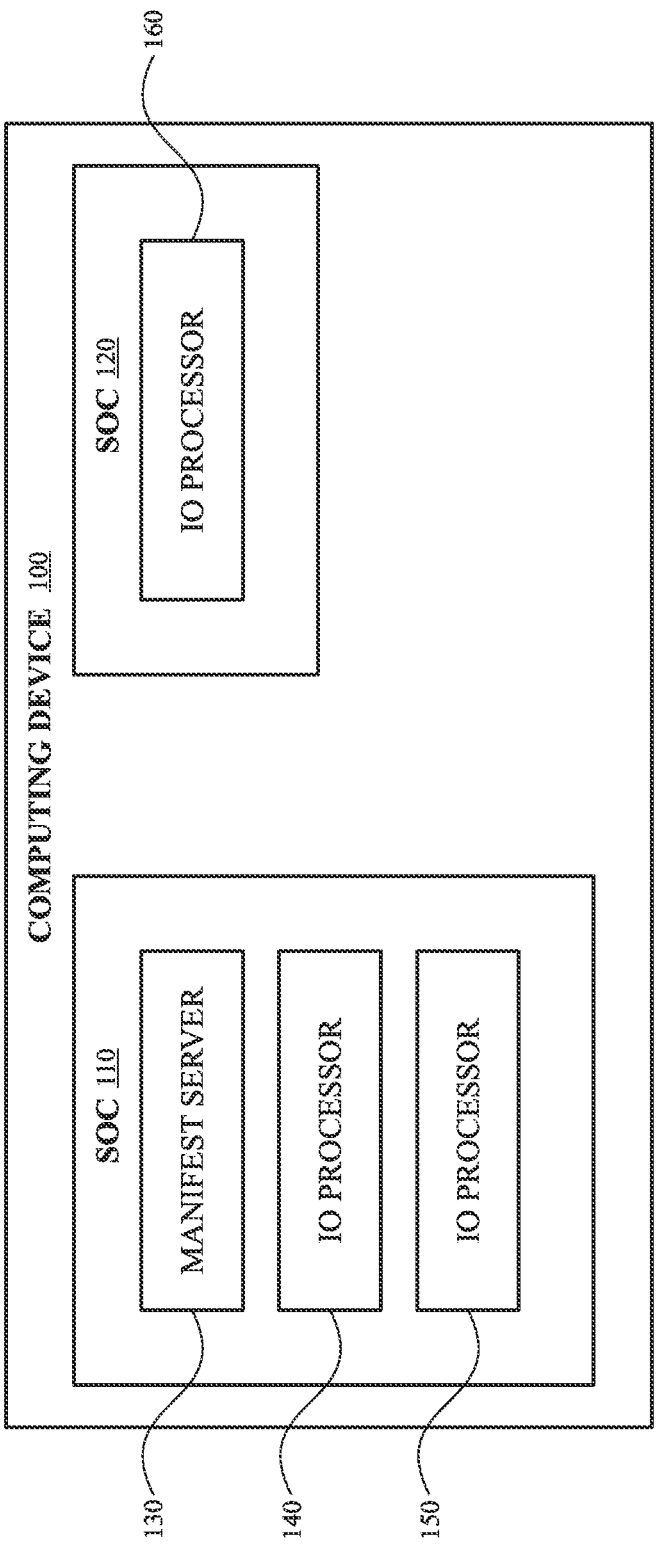
FIG. 1A is a block diagram depicting components of a computing device according to aspects of the subject technology.

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. FIG. 1A is a block diagram depicting components of a computing device according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 1A, computing device 100 includes system on a chip (SOC) 110, SOC 120, manifest server 130, and input/output (IO) processors 140, 150, and 160. IO processors 140, 150, and 160 are configured to control input and/or output operations of computing device 100. For example, computing device 100 may be a smartphone, a tablet device, or a wearable device such as a head-mountable device (as examples) with the IO processors controlling cameras, displays, content rendering, etc. The subject technology is not limited to this number of IO processors and may be implemented with more or fewer IO processors than those depicted in FIG. 1A.

In the example of FIG. 1A, manifest server 130 is configured to control the timing of IO processors 140, 150, and 160 performing operations to change an operating state of computing device 100 from a first state to a second state. In one or more implementations, the transitions may be between modes such as a virtual reality mode and a mixed reality mode, between different frame rates being displayed, enabling/disabling the display(s), etc. Transitions may also, or alternatively, include transitions to or from a bounded two-dimensional display mode from or to a bounded partial three-dimensional display mode, to or from a bounded two-dimensional display mode from or to a bounded three-dimensional display mode, to or from a bounded partial three-dimensional display mode from or to a bounded three-dimensional display mode, to or from a bounded display mode from or to a full-screen mixed reality display mode, to or from bounded display mode from or to a full-screen virtual reality display mode, to or from a full-screen mixed reality display mode from or to a full-screen virtual reality display mode, and/or to a pass-through video only mode from any of the above modes.

Any or all of these transitions may involve activating or deactivating one or more cameras and/or one or more sensors (e.g., depth sensors, light sensors, microphones, or the like), setting up buffers for upcoming data from the cameras and/or sensors, activating or deactivating processing operations for images, audio, display data, etc., and/or activating or deactivating other hardware and/or software elements of the computing device 100. The operation of manifest server 130 is described in further detail below. The operations described herein in which the manifest server 130 and/or another manifest server compile and distribute manifests to various processors for a transition can allow multiple separate processors and/or processes to concurrently execute their respective operations for the transitions in a time-coordinated matter that prevents artifacts and/or other timing errors from affecting the user's experience of using the device. For example, the subject technology may provide an effective system for coordinating the operations of multiple IO processors and/or other processors to be performed to effect a state transition of a computing device or computing system. The use of manifests to control the timing of the IO processors and/or other processors executing their respective operations makes coordination of the IO processors and/or other processors possible without requiring the IO processors and/or other processors to communicate with each other regarding their respective operations. This reduction in communications saves power in the computing system or computing device and frees up resources for other processes in the computing system or computing device.

In the example of FIG. 1A, manifest server 130 and IO processors 140 and 150 are part of SOC 110 and IO processor 160 is part of SOC 120. Manifest server 130 and IO processors 140, 150, and 160 may include suitable logic, circuitry, and/or code that enable processing data and/or controlling operations of computing device 100. These components, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both hardware and software.

Figure 1B:
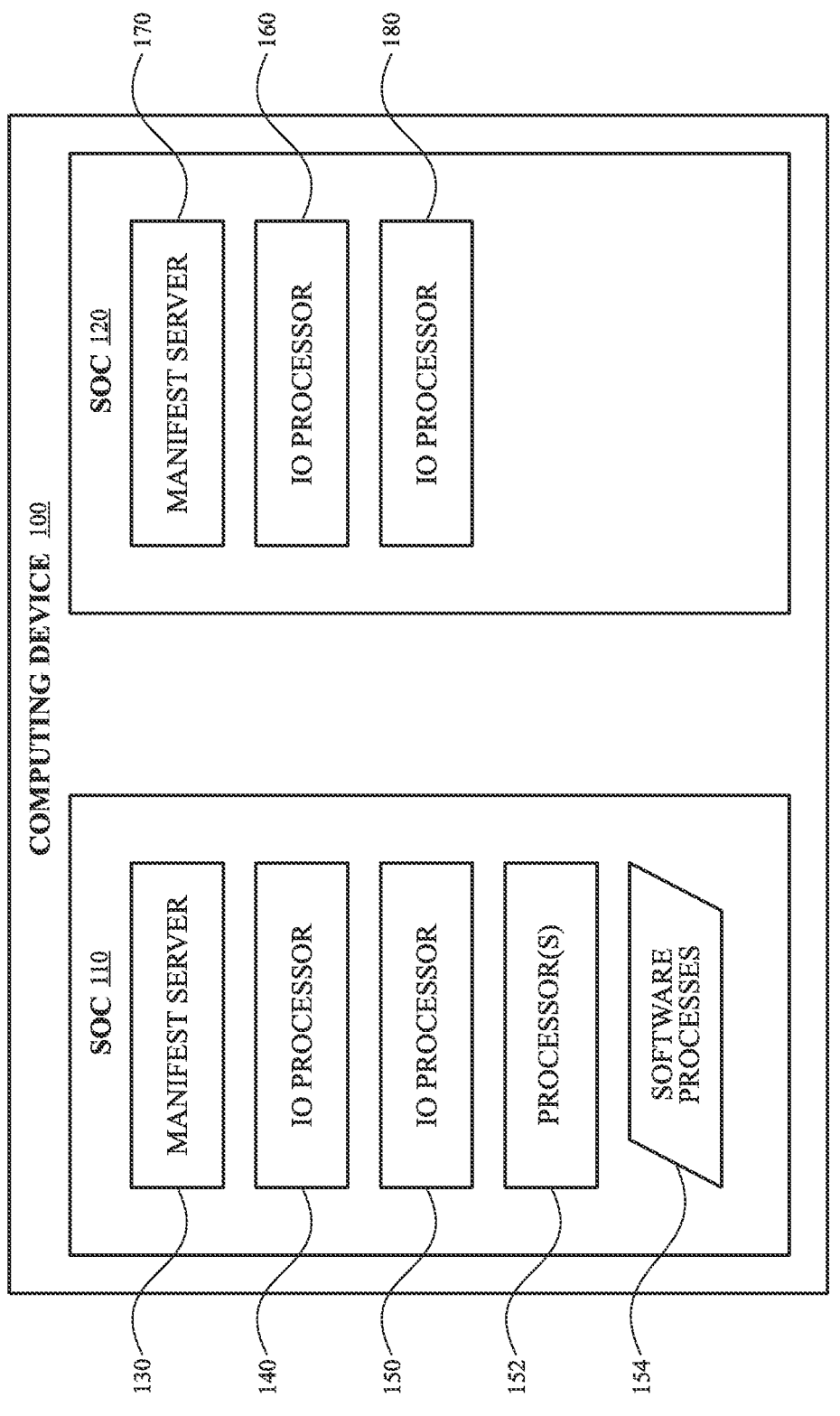
FIG. 1B is a block diagram depicting components of another implementation of a computing device according to aspects of the subject technology.

The example of FIG. 1A in which the computing device 100 includes the SOC 110, the SOC 120, the manifest server 130, and the IO processors 140, 150, and 160 is merely illustrative, and, in other implementations, the computing device 100 may include one or more other processors, one or more other manifest servers, and/or may execute one or more software processes associated with a transition. For example, FIG. 1B illustrates an implementation in which the computing device 100 includes the SOC 110, the SOC 120, the manifest server 130, and the IO processors 140, 150, and 160, and additional includes one or more additional processors 152 on the SOC 110, one or more software processes 154 that may be executed by the processor(s) 152 and/or the IO processors 140, 150, and 160. In the example of FIG. 1B, the SOC 120 also includes one or more additional IO processors 180 and may include an additional manifest server, such as manifest server 170.

Manifest server 170, processor(s) 152, software processes 154, and/or IO processor 180 may include suitable logic, circuitry, and/or code that enable processing data and/or controlling operations of computing device 100. These components, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both hardware and software.

The subject technology may be implemented with a single SOC or with more than two SOCs, with differing or the same numbers of IO processors and/or other processors arranged in the respective SOCs. The subject technology also may be implemented with SOCs and their respective IO processors and/or other processors arranged in a computing system that includes one or more computing devices. For example, in a computing system with more than one computing device each computing device may include one or more SOCs, with each SOC including one or more IO processors. For example, although the SOC 110 and the SOC 120 are depicted as being included in the same computing device 100, in other implementations, the SOC 110 and the SOC 120 may be implemented in separate computing devices.

As indicated above, manifest server 130 may be configured to control the timing of the IO processors, other processors, and/or software processes performing operations to change an operating state of the computing device from a first state to a second state.

Figure 1C:
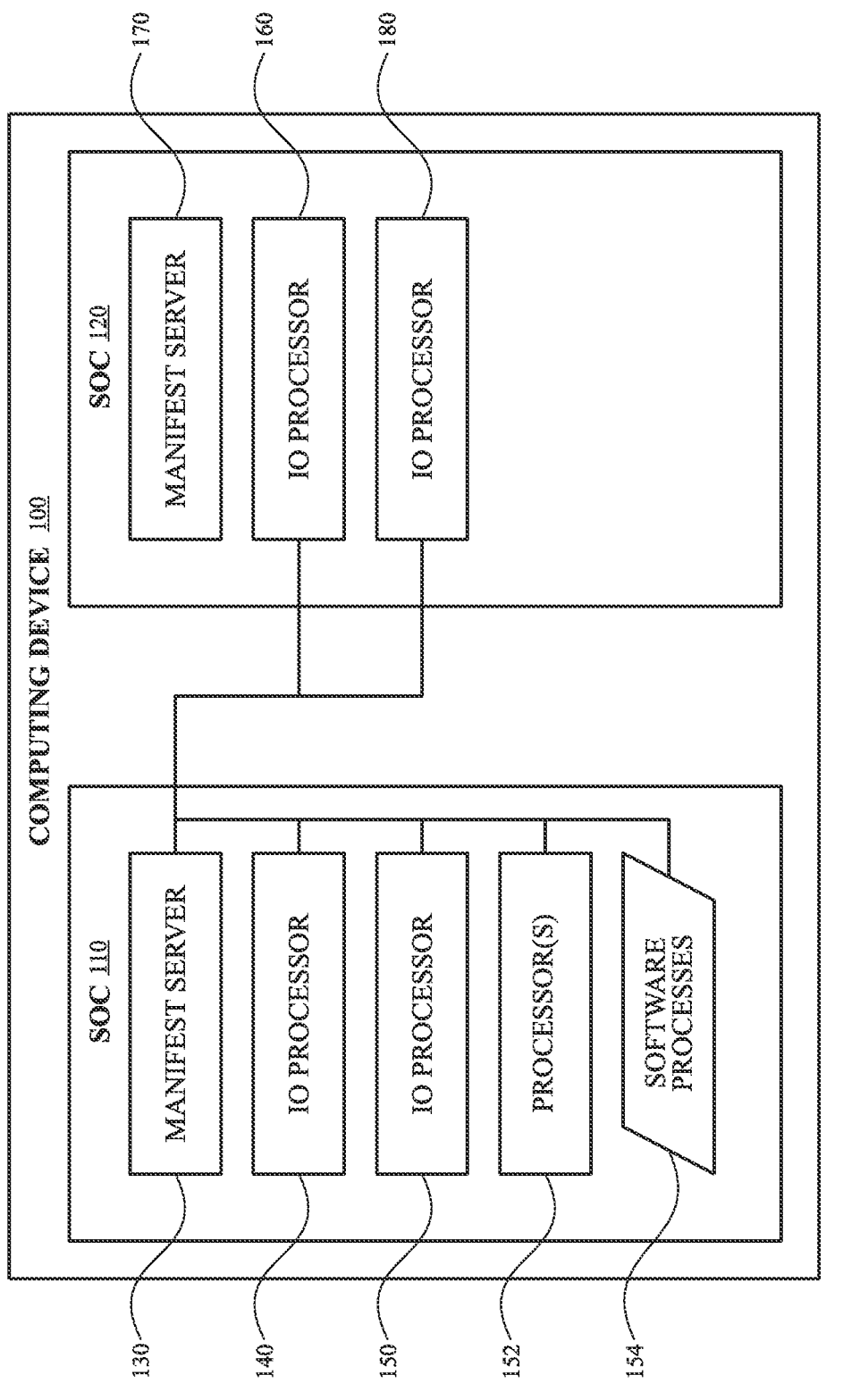
FIG. 1C is a block diagram depicting a manifest server distributing manifests according to aspects of the subject technology.

Briefly, in response to receiving a request to transition the computing device from a first state to a second state, the manifest server 130 may compile and dispatch a manifest to the IO processors (and/or other processors). In one or more implementations, the request may include a transition identifier of the requested transition. For example, FIG. 1C illustrates a use case in which the manifest server 130 provides the manifest to the IO processor 140, the IO processor 150, and the processor(s) 152 (e.g., and the software processes 154) on the SOC 110, and to the IO processor 160, the IO processor 180, and/or other IO processors on the SoC 120 (e.g., without involvement of the manifest server 170).

The manifest may include a transition identifier, that identifies a particular transition from a first state to a second state and represents a command to make that transition, a list of operations to be performed by each of the IO processors (and/or other processors), and/or a time at which the IO processors (and/or other processors) should execute operations associated with the transition identifier. The manifest may be provided in a message or other communication from the manifest server(s) to one or more processors. For example, a transition identifier might identify the transition from a virtual reality mode to a mixed reality mode, a transition from a bounded mode to an unbounded or full-screen mode, a transition from one frame rate to another frame rate, and/or other transitions as described herein. System clocks are synchronized across the SOCs so that all of the IO processors and/or other processors see the same absolute time to coordinate the execution of the operations based on the times included in the manifest(s) as described herein. This process will now be described in more detail with reference FIG. 2.

Figure 2:
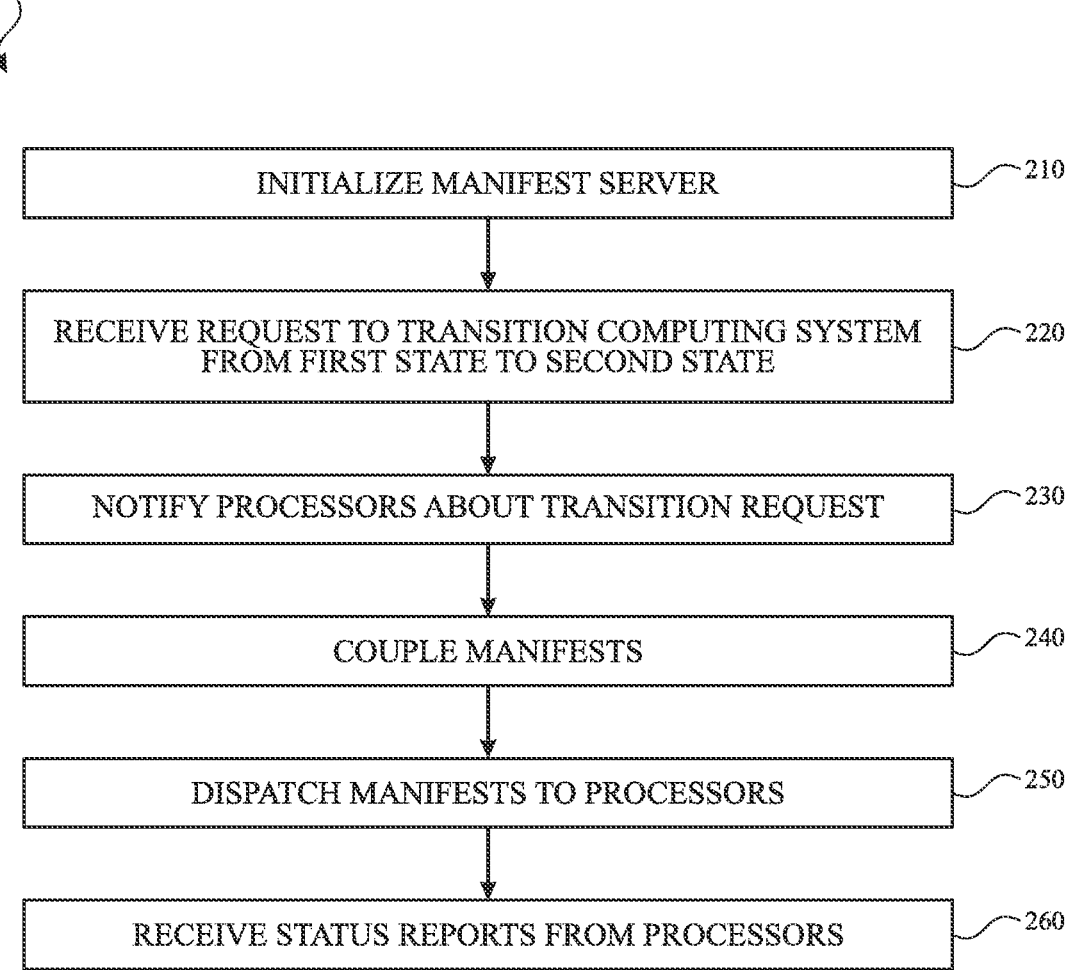
FIG. 2 is a flowchart illustrating an example process for controlling the timing of processors performing operations to change an operating state of a computing device according to aspects of the subject technology.

FIG. 2 is a flowchart illustrating an example process 200 for controlling the timing of IO processors performing operations to change an operating state of a computing device according to aspects of the subject technology. For explanatory purposes, the blocks of process 200 are described herein as occurring in serial, or linearly. However, multiple blocks of process 200 may occur in parallel. In addition, the blocks of process 200 need not be performed in the order shown and/or one or more blocks of process 200 need not be performed and/or can be replaced or supplemented by other operations.

Process 200 begins with initializing the manifest server (block 210). In particular, the manifest server may be instantiated in a host process. Once instantiated, the manifest server queries the IO processors and/or other processors for a manifest time and an execution time associated with each transition identifier for transitions available in the system. If an IO processor or other processor has one or more operations to execute to effect a transition of the computing device corresponding to a particular transition identifier, the IO processor or other processor returns the manifest time, which represents a period of time needed by the IO processor or other processor to prepare in advance of executing the one or more operations, and the execution time, which represents the period of time needed by the IO processor or other processor to execute the one or more operations associated with the transition identifier. The one or more operations to effect a transition in a head-mountable device may include operations for frame-level synchronization across IO processors or other processors. If an IO processor or other processor is not involved in a particular transition of the computing device, the IO processor or other processor returns a failure in response to a query for the transition identifier associated with that transition, and/or returns an indication that no operations need to be performed by the IO processor or other processor for the particular transition.

Alternatively, the IO processors and/or other processors may register with the manifest server once the manifest server has been instantiated. When an IO processor or other processor is initialized, the IO processor or other processor may query an operating system of the computing device to determine if the manifest server has been instantiated. If the manifest server has not been instantiated, the IO processor or other processor may request the operating system to notify the IO processor or other processor when the manifest server is instantiated. Once the IO processor or other processor becomes aware of the manifest server, the IO processor or other processor registers with the manifest server by indicating the different transitions, identified by a transition identifier, that the IO processor or other processor executes one or more operations to effect the transitions. For each of the indicated transitions the IO processor or other processor also provides the manifest time and the execution time associated with the transition.

Once initialized, the manifest server waits to receive a request to transition the computing device from a first state to a second state (block 220). The request may be received from an application or from the operating system of the computing device. Upon receiving the request, the manifest server may determine if there are any pending transitions that are still being processed by the IO processors and/or other processors. If there is a pending transition, the manifest server may wait until the IO processors and/or other processors have completed execution of the operations associated with the pending transition before proceeding in response to the received request. If the pending transition and the transition identified in the received request involve different subsets of IO processors and/or other processors executing operations to effect the respective transitions, the manifest server may proceed and have the two transitions occur in parallel. Similarly, if the operations executed by the IO processors and/or other processors are distinct for the two transitions, the manifest server may proceed and have the two transitions occur in parallel.

As part of a prepare phase, the manifest server may notify the IO processors and/or other processors of the received transition request (block 230). This notification allows the IO processors and/or other processors to prepare for the upcoming manifest by performing, for example, any cleanup or state management needed before the IO processor or other processor would be ready to execute the operations corresponding to the manifest. In response to the notification, the IO processors and/or other processors return a success indicator indicating either success or failure in preparing for the manifest. If the manifest server receives a failure indication, the manifest server may retry sending the notification to the IO processor or other processor that returned the failure indication until a success indication is received or other mitigating actions are taken.

The manifest server compiles a manifest for each IO processor or other processor participating in the transition of the computing device from the first state to the second state once the prepare phase discussed above has successfully completed (block 240). The manifest for a particular IO processor or other processor includes a transition identifier representing a command to transition from the first state to the second state. The manifest for a particular IO processor or other processor further includes an action time for that IO processor or other processor to execute one or more operations associated with the transition identifier. The action time may be determined by the manifest server using the manifest times provided by the IO processors and/or other processors when the manifest server was initialized. For example, the action time may be based on the maximum or longest manifest time returned by the IO processors and/or other processors. The action time may further be based on a transport time representing the period of time needed to transmit the manifests to the IO processors and/or other processors. According to aspects of the subject technology, the action time may be the maximum manifest time plus the transport time.

The manifest for an IO processor or other processor may be in the form of a table containing one or more operations to be performed by the receiving IO processor or other processor to effect the transition identified by a transition identifier. For tables containing more than one operation, the table may include a single action time to start execution of the sequence of operations, or may include a separate action time for each operation indicating when execution of the respective operation should be started. The table also may include a deadline indicating a time period after which the one or more operations are expected to be completed to effect the transition. As with the action time, the table may include a single deadline for completing all of the operations included in the table, or may include a separate deadline for each operation to complete. Using individual action times and deadlines for each of a sequence of operations indicated in the table facilitates better coordination between multiple IO processors and/or other processors that each must execute multiple operations to effect the transition.

Once the manifest server has compiled the manifests, the manifests are dispatched to the IO processors and/or other processors (block 250). At the action time(s) indicated in the manifests, each of the IO processors and/or other processors executes the one or more operations associated with the transition identifier in the manifests. Upon completion of the one or more operations, the IO processors and/or other processors may return a status report to the manifest server to inform the manifest server that the IO processor or other processor has completed the operations associated with the transition identifier (block 260). Alternatively, at the time of dispatching the manifests to the IO processors and/or other processors, the manifest server may set a timer to expire at the action time plus the execution time returned by the IO processors and/or other processors at initialization. Upon expiration of the timer, the manifest server may poll the IO processors and/or other processors to determine if the IO processors have completed execution of the one or more operations associated with the transition identifier. In addition to returning a successful status report to the manifest server, the IO processors and/or other processors may return an actual amount of time needed to complete the one or more operations to update the execution time obtained by the manifest server at the time of initialization.

Figure 3:
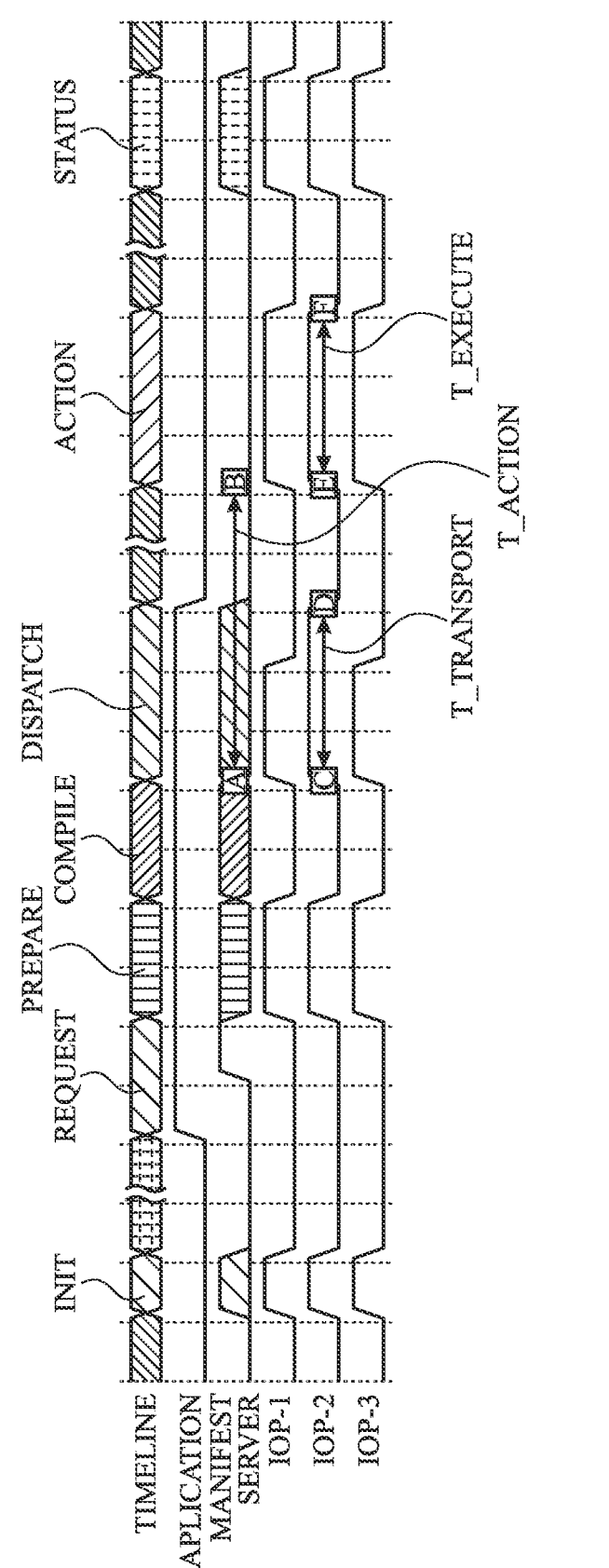
FIG. 3 is a timing chart illustrating the relative timing of the example process depicted in FIG. 2 according to aspects of the subject technology.

FIG. 3 is a timing chart illustrating the relative timing of process 200 described with respect to FIG. 2 according to aspects of the subject technology. As discussed above, the action time (t_action, indicated between time A and time B in FIG. 3) may be the maximum manifest time plus the transport time (t_transport, indicated between time C and time D in FIG. 3). As indicated in FIG. 3, the transport time may vary for different IO processors and/or other processors, but the action time is selected so that all of the IO processors and/or other processors begin execution of the operations to effect the transition at the same time. While the execution time (t_execute, indicated between time E and time F in FIG. 3) is depicted as being the same amount of time in FIG. 3, the execution time may vary between different IO processors and/or other processors.

In the example of FIGS. 2 and 3, the manifest server 130 of the SOC 110 provides the manifests to the IO processors and/or other processors of both the SOC 110 and the SOC 120. However, in some use cases, the manifest server 130 and/or the SOC 110 may become unavailable (e.g., in a failure state and/or during a restart process of the SOC 110). In one or more implementations, the manifest server 170 may act as a backup manifest server (e.g., responsive to a determination that the manifest server 130 and/or the SOC 110 are unavailable). For example, FIG. 4 illustrates an example use case in which the SOC 110 is in a failure state or in a restart process, and manifest server 130 acts as a backup manifest server for the computing device 100.

Figure 4:
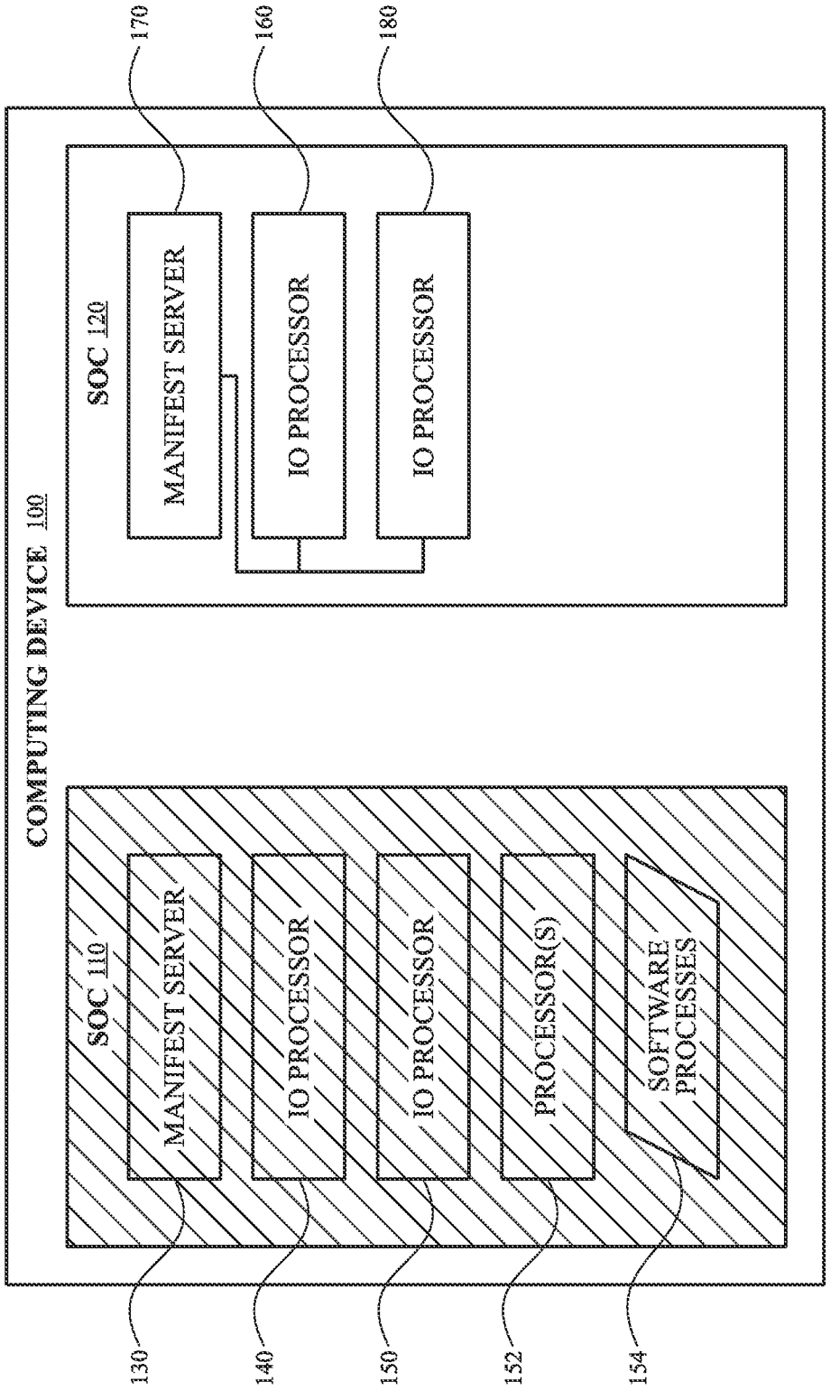
FIG. 4 is a block diagram depicting a backup manifest server distributing manifests to processors according to aspects of the subject technology.

As shown in FIG. 4, the manifest server may compile a manifest for each of the IO processors 160 and 180 on the SOC 120, and distribute the respective manifests to the IO processors 160 and 180 on the SOC 120. In this way, even when the SOC 110 is unavailable, the IO processor 160, the IO processor 180, and/or other IO processors (and/or other processors) at the SOC 120 can continue to operate. For example, the IO processor 160, the IO processor 180, and/or other IO processors (and/or other processors) at the SOC 120 process signals from components such as the display, the camera(s), and/or other sensor(s) of the computing device that are used to provide a pass-through view of the physical environment on the display of the computing device even when the SOC 110 is unavailable. For example, the IO processor 160, the IO processor 180, and/or other IO processors (and/or other processors) at the SOC 120 can execute a coordinated transition from a current operating state (e.g., a VR or MR operating state) of the computing device (when the SOC 110 is functioning) to a pass-through operating state in which only the view of the physical environment (e.g., and an overlaid notification such as restart notification or failure mode notification) is displayed (while the SOC 110 is unavailable). In this way, a user of the computing device 100 may continue to see their physical environment even in the failure mode of the SOC 110. In this example, the manifest server 170 may compile and distribute a manifest for a subset of the IO processors and/or other processors of the computing device 100 (e.g., using the manifest compilation and distribution operations of blocks 240, 250, and 260 of FIG. 2), such as the IO processors and/or other processors of the SOC 120.

FIG. 5 is a flowchart illustrating an example process 500 for controlling, by a backup manifest server, the timing of processors performing operations to change an operating state of a computing device according to aspects of the subject technology. For explanatory purposes, the blocks of process 500 are described herein as occurring in serial, or linearly. However, multiple blocks of process 500 may occur in parallel. In addition, the blocks of process 500 need not be performed in the order shown and/or one or more blocks of process 500 need not be performed and/or can be replaced or supplemented by other operations.

In the example of FIG. 5, at block 502, a backup manifest server (e.g., a second manifest server, such as manifest server 170 on a second SOC, such as SOC 120) of a device (e.g., computing device 100) may, responsive to a determination that a first manifest server (e.g., manifest server 130) or a first SOC (e.g., SOC 110 on which the first manifest server is implemented) is unavailable, compile, for a transition (e.g., a second transition after the first transition from the first state to the second state as described in FIG. 2) from a third state to a fourth state, a respective manifest for each of a subset of processors of the device. For example, the subset of the processors may be a second set of processors, other than a first set of processors implemented on a first SOC (e.g., the SOC 110) of the device, that are implemented on a second SOC (e.g., SOC 120) with the backup manifest server. In one or more implementations, determining that the first manifest server or the first SOC is unavailable may include receiving a fault signal (e.g., via general purpose I/O) from the first SOC at the second SOC, or detecting that first manifest server or the first SOC is unavailable at the second SOC (e.g., by identifying an absence of display updates for a predetermined period of time).

At block 504, the backup manifest server may dispatch the respective manifests compiled by the second manifest server, for the second transition, to the subset of the processors.

At block 506, the backup manifest server may receive status reports from the subset of the processors regarding the second transition from the third state to the fourth state. In one or more implementations, the fourth state may be a pass-through video state in which only pass-through video and a notification (e.g., a failure state notification or a restart notification) are displayed by a display of the device. In one or more implementations, the third state may be either of the first state or the second state described herein in connection with FIG. 2.

Figure 6:
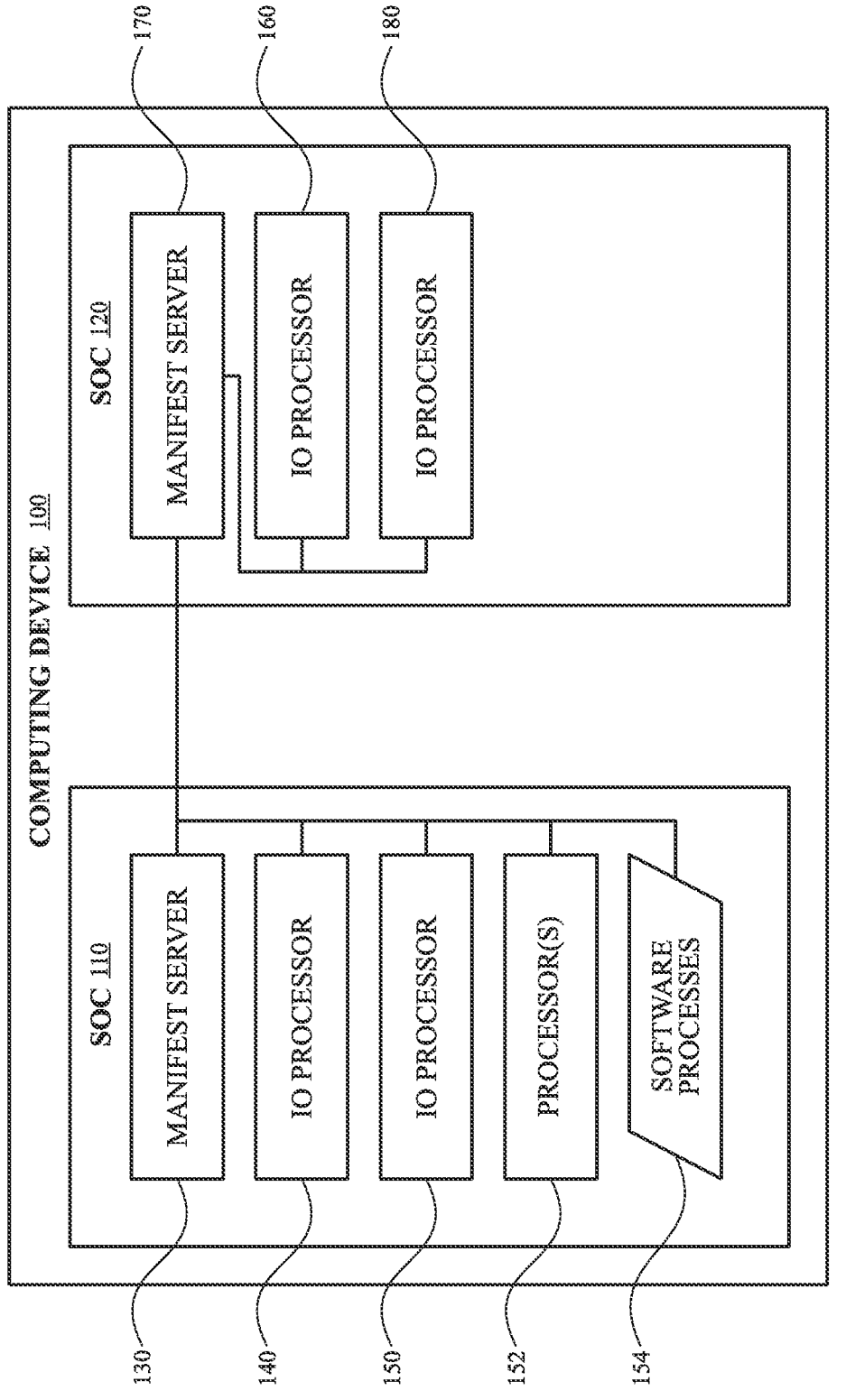
FIG. 6 is a block diagram depicting a first manifest server distributing manifests to a first set of processors and, via a second manifest server, to a second set of processors according to aspects of the subject technology.

In the examples of FIGS. 4 and 5, the manifest server 170 distributes the manifest to the IO processors of the SOC 120 when the SOC 110 and/or the manifest server 170 is in a failure state. In one or more other examples, the manifest server 170 may be operable to distribute manifests, received from the manifest server 130, to the IO processors of the SOC 120. For example, FIG. 6 illustrates an example in which the manifest server 130 provides the manifest(s) to the IO processor 140, the IO processor 150, and the processor(s) 152 (e.g., and the software processes 154) on the SOC 110, and to the manifest server 170 of the SOC 120. In this example, the manifest server 170 then distributes the manifest(s), received from the manifest server 130, to the IO processor 160, the IO processor 180, and/or other IO processors on the SoC 120. In this way, the manifest server 130 can dispatch respective manifests to a plurality of processors, in part, by dispatching respective manifests corresponding to a second set of processors on the SOC 120 to the second set of processors on the SOC 120 via the second manifest server 170.

Figure 7:
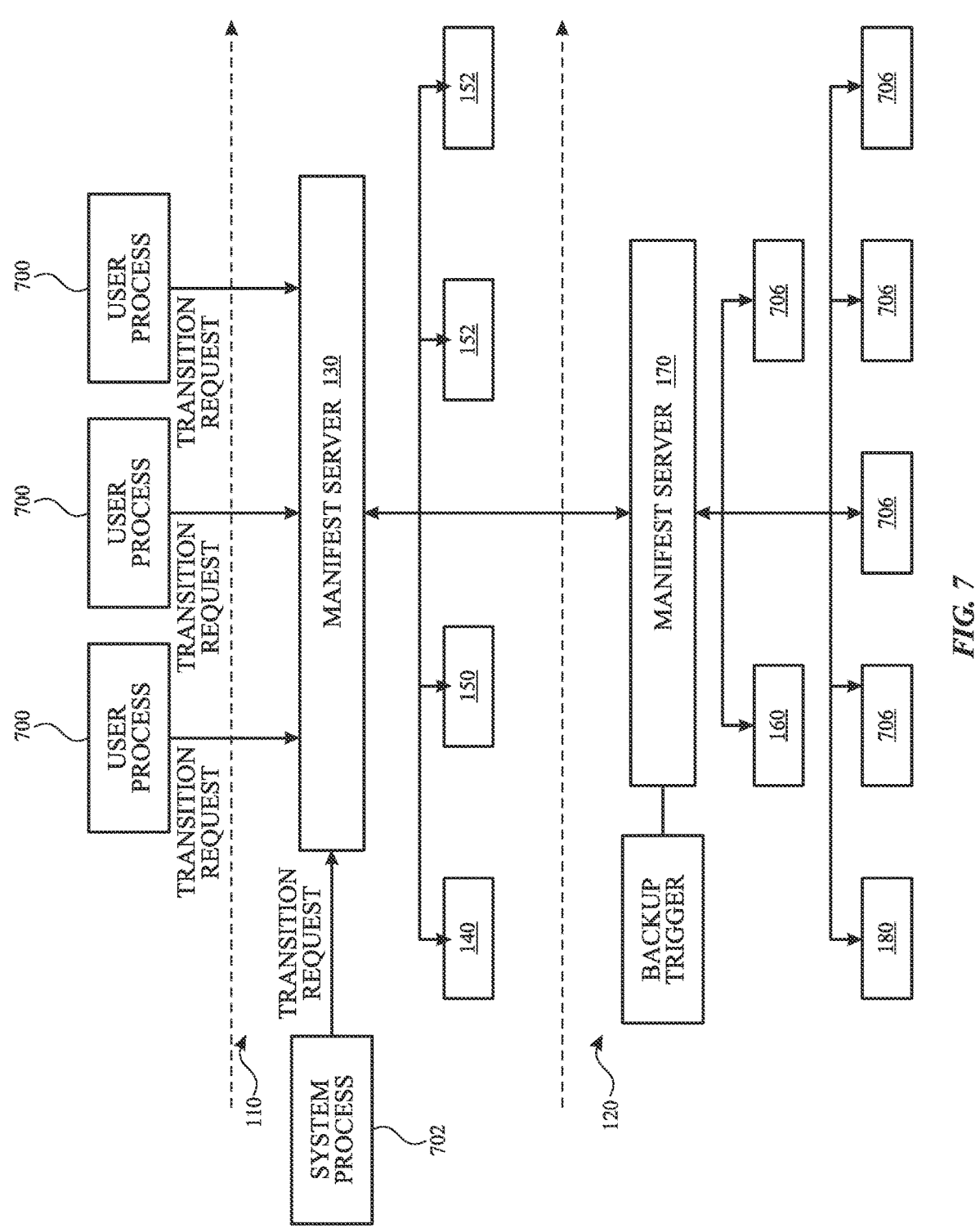
FIG. 7 is a block diagram depicting a first manifest server distributing manifests to a first set of processors and, via a second manifest server, to a second set of processors responsive to a request to transition from a first state to a second state according to aspects of the subject technology.

FIG. 7 illustrates a block diagram showing how the manifest server 130 may receive a transition request from any of various user processes 700 (e.g., application processes) and/or system processes 702. In one or more implementations, the manifest server 130 may compile and distribute manifests to the IO processor 140, the IO processor 150, and/or one or more processor(s) 150 on the SOC 110, and may distribute manifests for the IO processor 160, the IO processor 180, and/or one or more other IO processors 706 to the manifest server 170. The manifest server 170 may then distribute the manifests, received from the manifest server 130 for the IO processor 160, the IO processor 180, and/or one or more other IO processors 706 of the SOC 120, to the IO processor 160, the IO processor 180, and/or one or more other IO processors 706 of the SOC 120. As illustrated in FIG. 6, the manifest server 170 may also, in some use cases, receive a backup trigger, and begin compiling and distributing manifests for the IO processor 160, the IO processor 180, and/or one or more other IO processors 706 of the SOC 120 (e.g., as described above in connection with FIGS. 4 and 5).

Figure 8A:
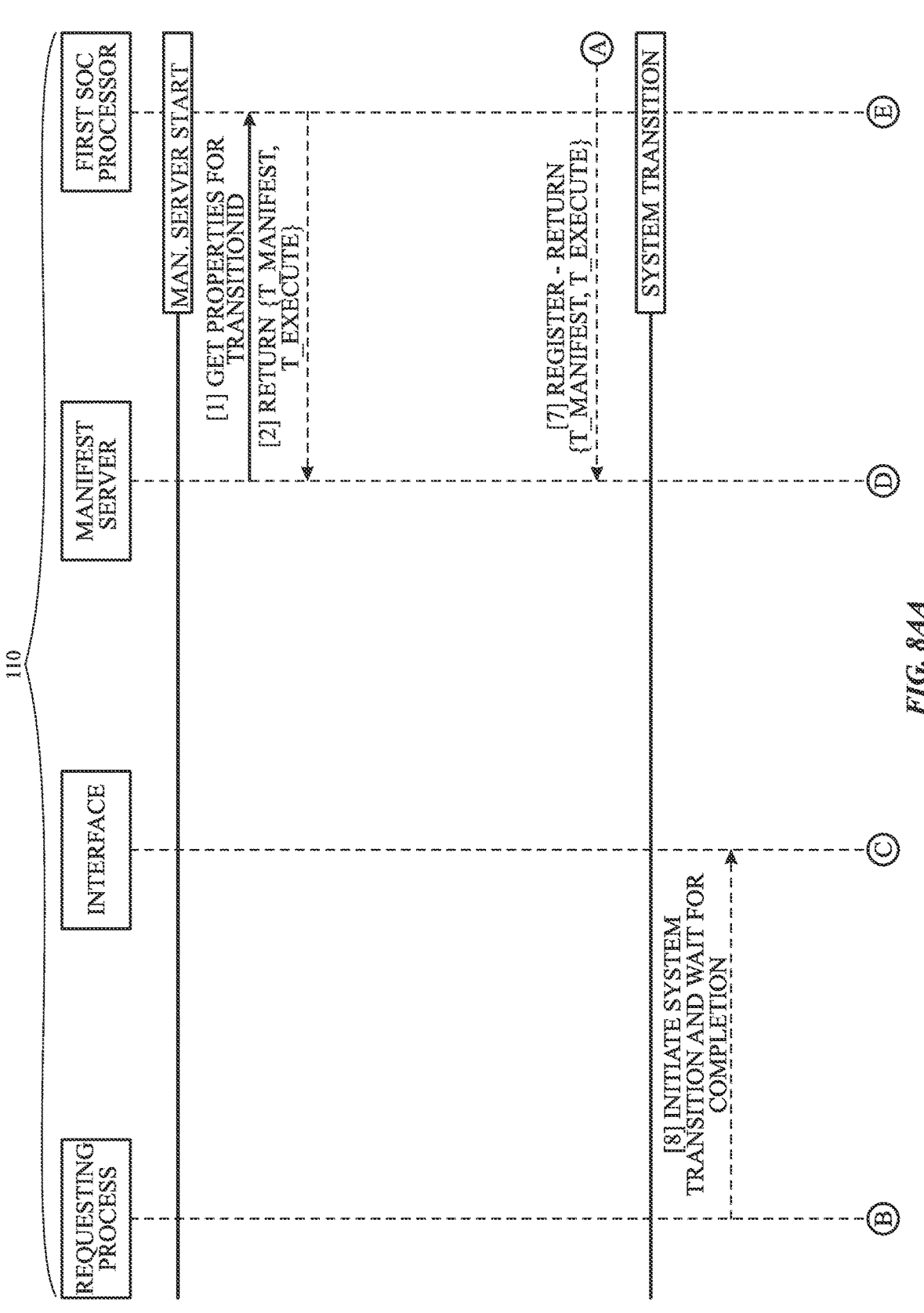
FIGS. 8AA, 8AB, 8AC, 8AD, and 8BA, 8BB, 8BC, and 8BD form a sequence diagram depicting a first manifest server distributing manifests to a first set of processors and, via a second manifest server, to a second set of processors responsive to a request to transition from a first state to a second state according to aspects of the subject technology.
Figure 8A:
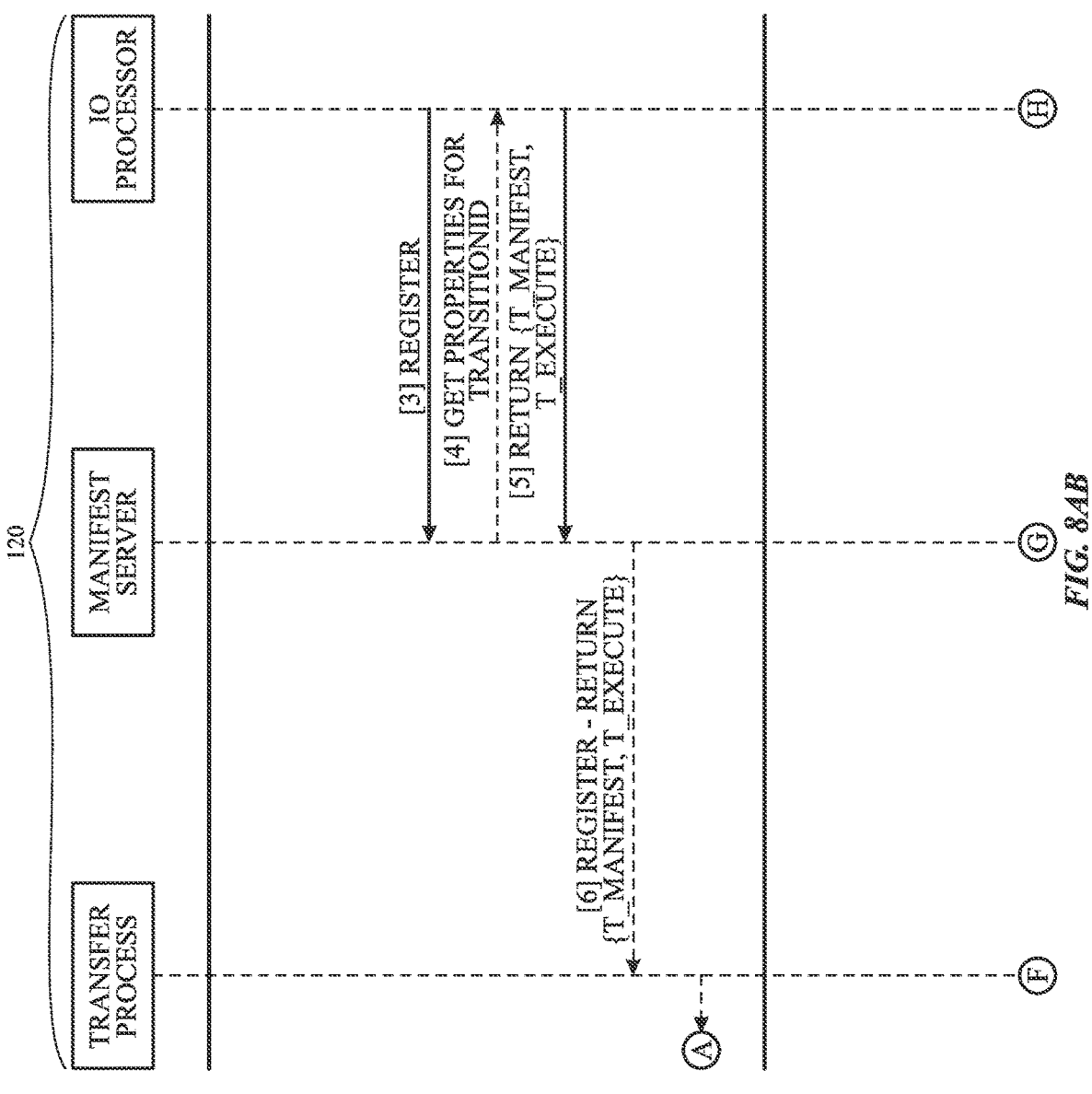
Figure 8A:
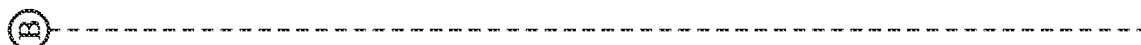
Figure 8A:
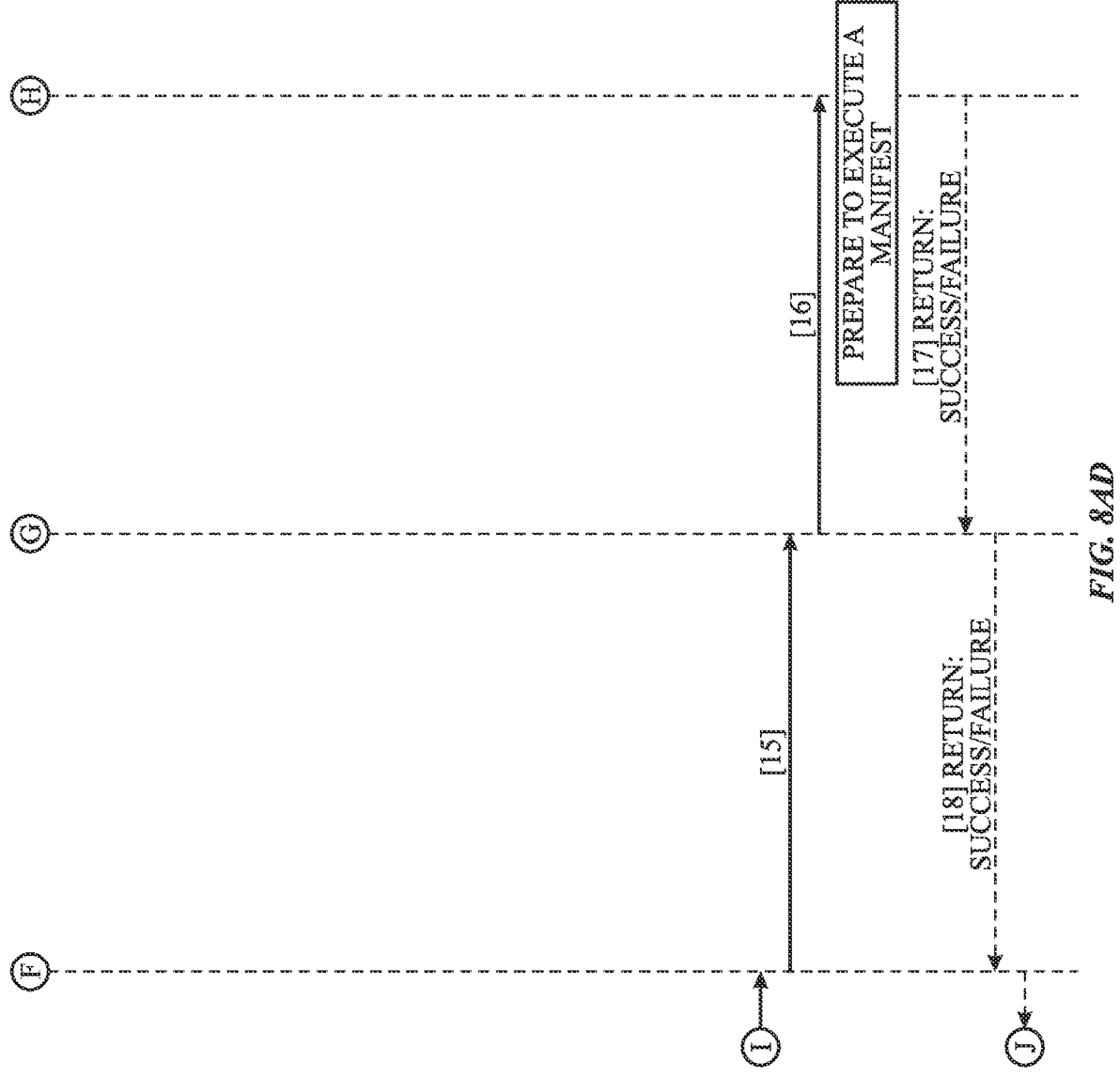

FIGS. 8AA, 8AB, 8AC, 8AD, and 8BA, 8BB, 8BC, and 8BD form a sequence diagram illustrating communications that may be performed for distributing/dispatching manifests as in the example of FIG. 7. As shown in FIGS. 8AA, 8AB, 8AC, 8AD, the manifest server (e.g., manifest server 130) of the SOC 110 may request properties, for a transition having a transition identifier (transitionID), from a first SOC processor (e.g., IO processor 140, IO processor 150, and/or one or more processor(s) 152)) of the SOC 110. The first SOC processor of the SOC 110 may then return properties (e.g., t_manifest and t_execute) for that transition. As shown, an IO processor (e.g., IO processor 160 or IO processor 180) may provide a request to register to a manifest server (e.g., manifest server 170) of the SOC 120. Responsively, the manifest server of the SOC 120 may request properties, for a transition having a transition identifier, from the IO processor of the SOC 120. The IO processor of the SOC 120 may then return properties (e.g., t_manifest and t_execute) for that transition. As shown, the manifest server of the SOC 120 may provide the properties from the IO processor of the SOC 120 to the manifest server of the SOC 110 via a transfer process of the SOC 120.

As shown in FIGS. 8AA, 8AB, 8AC, 8AD, a requesting process (e.g., a user process 700 or a system process 702) may initiate a system transition with a particular transition identifier, by providing a transition request to an interface for the manifest server 130 of the SOC 110, and wait for completion of the transition. As shown, the interface for the manifest server of the SOC 110 may check with the manifest server of the SOC 110 whether any processors are registered. If no processors are registered for that transition identifier, the interface for the manifest server of the SOC 110 may wait and retry until a timeout occurs. If any processors are registered, the interface for the manifest server of the SOC 110 may schedule the transition for the particular transition identifier. In the example of FIG. 8A, the request is for the transition for which the first SOC processor of the SOC 110 and the IO processor of the SOC 120 previously provided properties (e.g., registered).

As shown in FIGS. 8AA, 8AB, 8AC, 8AD, the manifest server of the SOC 110 may then check for a pending manifest and instruct the first SOC processor of the SOC 110 and the IO processor of the SOC 120 to prepare to execute a manifest. As shown, the first SOC processor of the SOC 110 and the IO processor of the SOC 120 may return a success message (if operations are to be performed by that processor for the requested transition) or a failure message (if no operations are to be performed by that processor for the requested transition) to the manifest server of the SOC 110. In the example of FIGS. 8AA, 8AB, 8AC, 8AD, and 8BA, 8BB, 8BC, and 8BD, the first SOC processor of the SOC 110 and the IO processor of the SOC 120 return a success message.

Figure 8B:
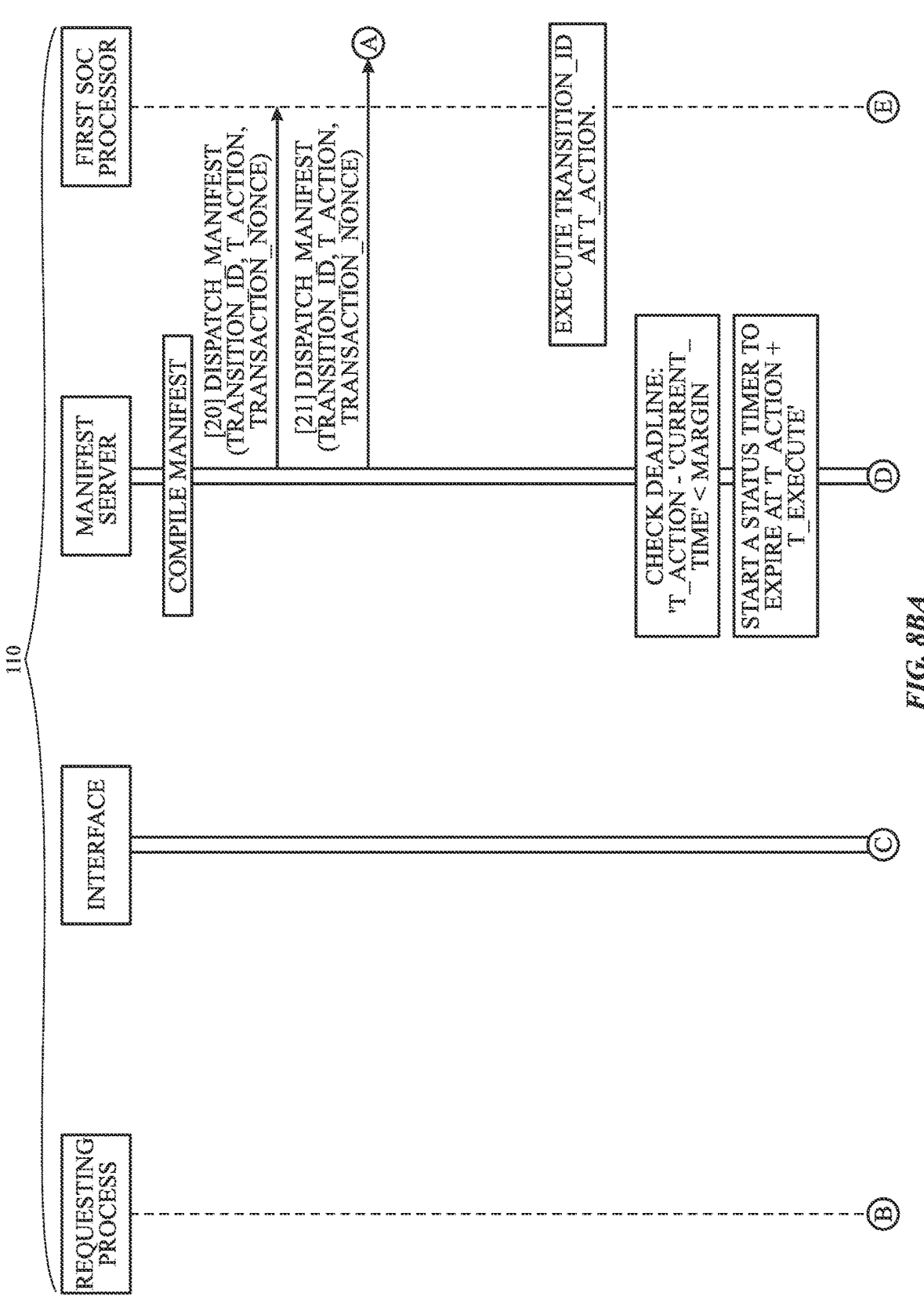
Figure 8B:
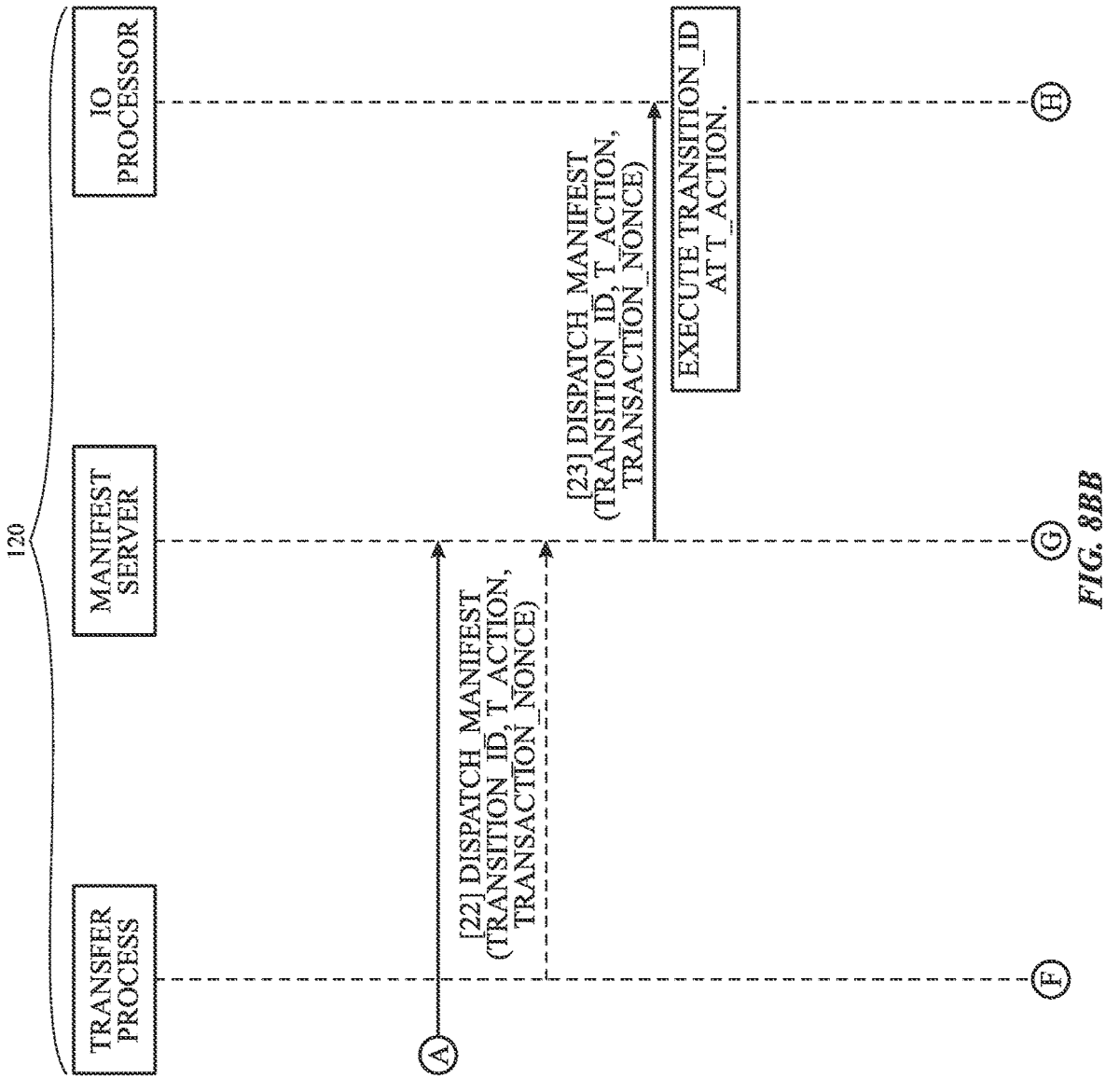
Figure 8B:
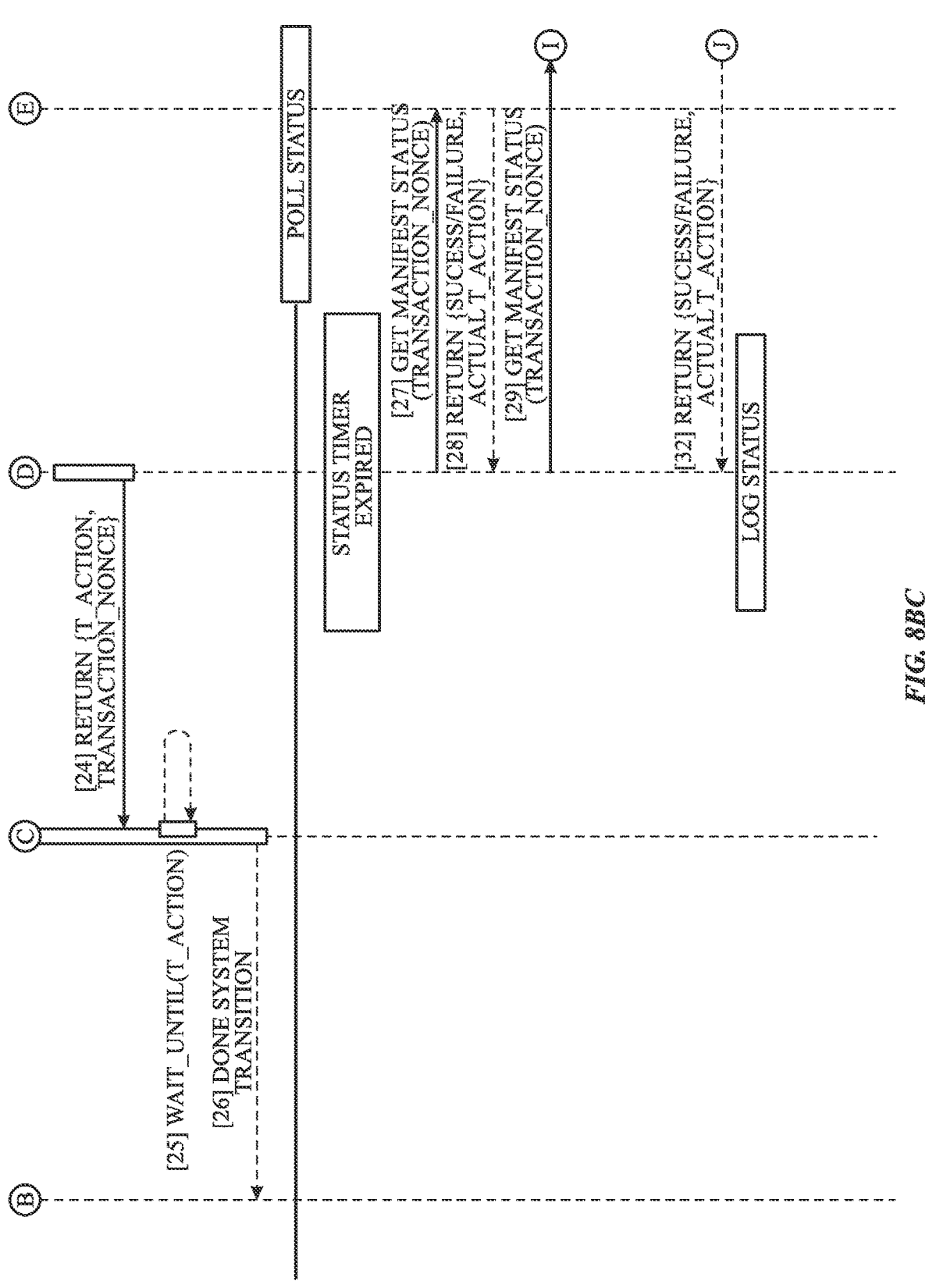
Figure 8B:
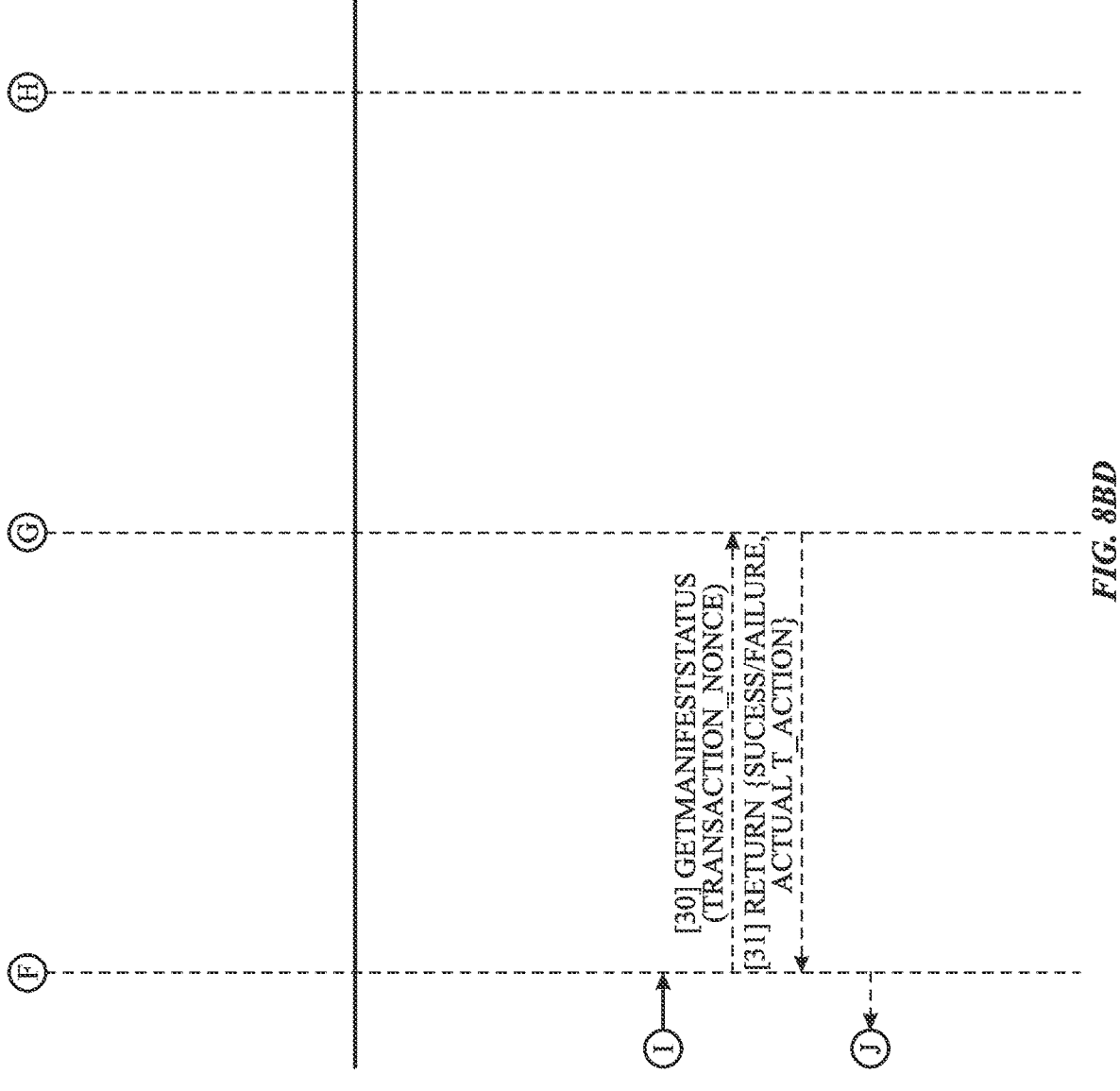

As shown in FIGS. 8BA, 8BB, 8BC, and 8BD, responsive to receiving the success messages, the manifest server of the SOC 110 compiles manifests, including a time t_action as described herein, for each of the first SOC processor of the SOC 110 and the IO processor of the SOC 120, and dispatches the manifests to the first SOC processor of the SOC 110 and the IO processor of the SOC 120. In the example FIGS. 8BA, 8BB, 8BC, and 8BD, the manifest for the IO processor of the SOC 120 is dispatched to the IO processor of the SOC 120 via the manifest server of the SOC 120. As shown in FIGS. 8BA, 8BB, 8BC, and 8BD, the first SOC processor of the SOC 110 and the IO processor of the SOC 120 may each execute the requested transition at the time t_action specified in the manifests.

As shown in FIGS. 8BA, 8BB, 8BC, and 8BD, the manifest server of the SOC 110 may check for a deadline for completion of the transition (e.g., by comparing the difference between t_action and the current time to a margin threshold), and may start a status timer to expire at a time t_action+t_execute. As shown, the manifest server of the SOC 110 may return t_action to the interface, and the interface may wait until t_action expires to report to the requesting process that the requested transition is completed. As shown in FIGS. 8BA, 8BB, 8BC, and 8BD, the manifest server of the SOC 110 may also perform a status polling operation after expiration of the timer. In the polling operation, the manifest server of the SOC 110 may request a manifest status from the first SOC processor of the SOC 110 and from the manifest server of the SOC 120. As shown, the first SOC processor of the SOC 110 and the manifest server of the SOC 120 may return statuses including a success or failure status for the manifest and an actual time t_action, and the manifest server of the SOC 110 may then log the received statuses.

As discussed above, the subject technology provides an effective system for coordinating the operations of multiple IO processors and/or other processors to be performed to effect a state transition of a computing device or computing system. The use of manifests to control the timing of the IO processors and/or other processors executing their respective operations makes coordination of the IO processors and/or other processors possible without requiring the IO processors and/or other processors to communicate with each other regarding their respective operations. This reduction in communications saves power in the computing system or computing device and frees up resources for other processes in the computing system or computing device.

Figure 9:
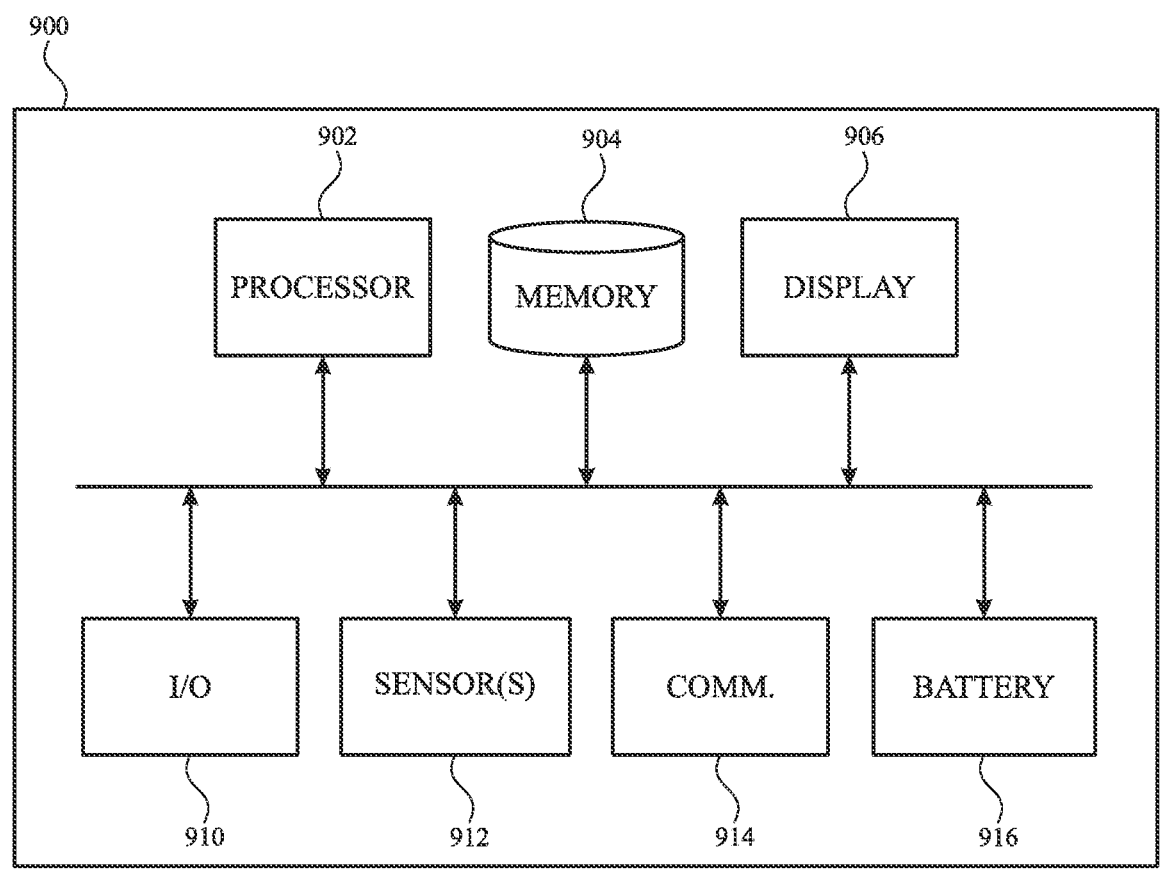
FIG. 9 is a block diagram of a computing system according to aspects of the subject technology.

As noted above, computing device 100 may be implemented as a smartphone, a tablet device, a laptop device, or a wearable device such as a head-mountable device. FIG. 9 is a block diagram of computing system 900, that may be implemented as a smartphone, a tablet device, a laptop device, or a wearable device such as a head-mountable device, according to aspects of the subject technology. It will be appreciated that components described herein can be provided on either or both of a frame and/or a securement element of the computing system 900. It will be understood that additional components, different components, or fewer components than those illustrated may be utilized within the scope of the subject disclosure.

As shown in FIG. 9, the computing system 900 can include a processor 902 (e.g., control circuitry) with one or more processing units that include or are configured to access a memory 904 having instructions stored thereon. The instructions or computer programs may be configured to perform one or more of the operations or functions described with respect to the computing system 900. The processor 902 can be implemented as any electronic device capable of processing, receiving, or transmitting data or instructions. For example, the processor 902 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 904 can store electronic data that can be used by the computing system 900. For example, the memory 904 can store electrical data or content such as, for example, audio and video files, documents and applications, device settings and user preferences, timing and control signals or data for the various modules, data structures or databases, and so on. The memory 904 can be configured as any type of memory. By way of example only, the memory 904 can be implemented as random access memory, read-only memory, Flash memory, removable memory, or other types of storage elements, or combinations of such devices.

The computing system 900 can further include a display unit 906 for displaying visual information for a user. The display unit 906 can provide visual (e.g., image or video) output. The display unit 906 can be or include an opaque, transparent, and/or translucent display. The display unit 906 may have a transparent or translucent medium through which light representative of images is directed to a user's eyes. The display unit 906 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The computing system 900 can include an optical subassembly configured to help optically adjust and correctly project the image based content being displayed by the display unit 906 for close up viewing. The optical subassembly can include one or more lenses, mirrors, or other optical devices.

The computing system 900 can include an input/output component 910, which can include any suitable component for connecting computing system 900 to other devices. Suitable components can include, for example, audio/video jacks, data connectors, or any additional or alternative input/output components. The input/output component 910 can include buttons, keys, or another feature that can act as a keyboard for operation by the user. Input/output component 910 may include a microphone. The microphone may be operably connected to the processor 902 for detection of sound levels and communication of detections for further processing, as described further herein. Input/output component 910 also may include speakers. The speakers can be operably connected to the processor 902 for control of speaker output, including sound levels, as described further herein.

The computing system 900 can include one or more other sensors 912. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

The computing system 900 can include communications circuitry 914 for communicating with one or more servers or other devices using any suitable communications protocol. For example, communications circuitry 914 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, Bit-Torrent, FTP, RTP, RTSP, SSH, any other communications protocol, or any combination thereof. Communications circuitry 914 can also include an antenna for transmitting and receiving electromagnetic signals.

The computing system 900 can include a battery 916, which can charge and/or power components of the computing system 900. The battery can also charge and/or power components connected to the computing system 900.

While various embodiments and aspects of the present disclosure are illustrated with respect to a head-mountable device, it will be appreciated that the subject technology can encompass and be applied to other electronic devices. Such an electronic device can be or include a desktop computing device, a laptop-computing device, a display, a television, a portable device, a phone, a tablet computing device, a mobile computing device, a wearable device, a watch, and/or a digital media player.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

According to aspects of the subject technology, a method is provided that includes receiving a request to transition a computing system from a first state to a second state, and compiling a respective manifest for each of a plurality of processors of the computing system. Each manifest comprises a transition identifier representing a command to transition from the first state to the second state and an action time for executing one or more operations associated with the transition identifier. The respective manifests are dispatched to the plurality of processors, and status reports are received from the plurality of processors regarding the transition from the first state to the second state.

The method may further include receiving a manifest time associated with the transition identifier from each of the plurality of processors, wherein the manifest time corresponds to an advance time required by the plurality of processors before executing the one or more operations, and wherein the action time is based on the manifest time. The action time may be based on a maximum manifest time received from the plurality of processors. The action time may be further based on a transport time, wherein the transport time corresponds to a period of time between dispatching the respective manifests to the plurality of processors and receiving the respective manifests by the plurality of processors.

The method may further include receiving an execution time associated with the transition identifier from each of the plurality of processors, wherein the execution time corresponds to a period of time approximated for executing the one or more operations associated with the transition identifier. The action time may be based on the execution time associated with a previous manifest dispatched to the plurality of processors. The method may further include setting a timer based on the action time and the execution time, and polling the plurality of processors upon expiration of the timer, wherein the status reports are received from the plurality of processors in response to the polling.

The method may further include notifying the plurality of processors about the manifests before dispatching the plurality of manifests to the plurality of processors, and receiving a success indicator from the plurality of processors in response to notifying the plurality of processors about the manifests.

According to aspects of the subject technology, a non-transitory computer-readable medium storing instructions which, when executed by one or more processors, cause the one or more processors to perform operations is provided. The operations include receiving a request to transition a computing device from a first state to a second state and compiling a respective manifest for each of a plurality of processors of the computing device. Each manifest comprises a transition identifier representing a command to transition from the first state to the second state and an action time for executing one or more operations associated with the transition identifier. The operations further include dispatching the respective manifests to the plurality of processors, polling the plurality of processors upon expiration of a timer, and receiving status reports from the plurality of processors regarding the transition from the first state to the second state in response to the polling.

The operations may further include receiving a manifest time associated with the transition identifier from each of the plurality of processors, wherein the manifest time corresponds to an advance time required by the plurality of processors before executing the one or more operations, and wherein the action time is based on the manifest time. The action time may be based on a maximum manifest time received from the plurality of processors. The action time may be further based on a transport time, wherein the transport time corresponds to a period of time between dispatching the respective manifests to the plurality of processors and receiving the respective manifests by the plurality of processors.

The operations may further include receiving an execution time associated with the transition identifier from each of the plurality of processors, wherein the execution time corresponds to a period of time approximated for executing the one or more operations associated with the transition identifier. The action time may be based on the execution time associated with a previous manifest dispatched to the plurality of processors.

The operations may further include notifying the plurality of processors about the manifests before dispatching the plurality of manifests to the plurality of processors, and receiving a success indicator from the plurality of processors in response to notifying the plurality of processors about the manifests.

According to aspects of the subject technology, a device is provided that includes a memory storing a plurality of computer programs, and one or more processors configured to execute instructions of the plurality of computer programs to receive a request to transition the device from a first state to a second state, and receive, from each of a plurality of processors a manifest time associated with a transition identifier representing a command to transition from the first state to a second state. The manifest time corresponds to an advance time required by the plurality of processors before executing one or more operations associated with the transition identifier. A respective manifest is compiled for each of the plurality of processors of the device, wherein each manifest comprises the transition identifier and an action time for executing the one or more operations associated with the transition identifier, wherein the action time is based on the manifest time, the respective manifests are dispatched to the plurality of processors, and status reports are received from the plurality of processors regarding the transition from the first state to the second state.

The action time may be further based on a transport time, and wherein the transport time corresponds to a period of time between dispatching the respective manifests to the plurality of processors and receiving the respective manifests by the plurality of processors. The one or more processors may be further configured to execute instructions to receive an execution time associated with the transition identifier from each of the plurality of processors, wherein the execution time corresponds to a period of time approximated for executing the one or more operations associated with the transition identifier.

The one or more processors may be further configured to execute instructions to set a timer based on the action time and the execution time, and poll the plurality of processors upon expiration of the timer, wherein the status reports are received from the plurality of processors in response to the polling. The one or more processors may be further configured to execute instructions to notify the plurality of processors about the manifests before dispatching the plurality of manifests to the plurality of processors, and receive a success indicator from the plurality of processors in response to notifying the plurality of processors about the manifests.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

The collection and transfer of data from an application to other computing devices may occur. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
receiving a request to transition a computing system from a first state to a second state;
receiving, from each of a plurality of processors of the computing system, a manifest time associated with a transition identifier representing a command to transition from the first state to the second state, wherein the manifest time corresponds to an advance time required by the plurality of processors before executing one or more operations associated with the transition identifier;
compiling a respective manifest for each of the plurality of processors, wherein each manifest comprises the transition identifier and an action time for executing the one or more operations associated with the transition identifier, wherein the action time is based on the manifest time;
dispatching the respective manifests to the plurality of processors; and
receiving status reports from the plurality of processors regarding the transition from the first state to the second state.

2. The method of claim 1, wherein the action time is based on a maximum manifest time received from the plurality of processors.

3. The method of claim 1, wherein the action time is further based on a transport time, wherein the transport time corresponds to a period of time between dispatching the respective manifests to the plurality of processors and receiving the respective manifests by the plurality of processors.

4. The method of claim 1, further comprising:
receiving an execution time associated with the transition identifier from each of the plurality of processors, wherein the execution time corresponds to a period of time approximated for executing the one or more operations associated with the transition identifier.

5. The method of claim 4, wherein the action time is based on the execution time associated with a previous manifest dispatched to the plurality of processors.

6. The method of claim 4, further comprising:
setting a timer based on the action time and the execution time; and
polling the plurality of processors upon expiration of the timer,
wherein the status reports are received from the plurality of processors in response to the polling.

7. The method of claim 1, further comprising:
notifying the plurality of processors about the respective manifests before dispatching the respective manifests to the plurality of processors; and
receiving a success indicator from the plurality of processors in response to notifying the plurality of processors about the respective manifests.

8. The method of claim 4, wherein receiving the status reports comprises receiving an actual amount of time needed to complete the one or more operations associated with the transition identifier from at least one of the plurality of processors to update the execution time.

9. A non-transitory computer-readable medium storing instructions which, when executed by one or more processors, cause the one or more processors to perform operations comprising:
receiving a request to transition a computing device from a first state to a second state;
receiving, from each of a plurality of processors of the computing device, a manifest time associated with a transition identifier representing a command to transition from the first state to the second state, wherein the manifest time corresponds to an advance time required by the plurality of processors before executing one or more operations associated with the transition identifier;
compiling a respective manifest for each of the plurality of processors, wherein each manifest comprises the transition identifier and an action time for executing the one or more operations associated with the transition identifier, wherein the action time is based on the manifest time;
dispatching the respective manifests to the plurality of processors;
polling the plurality of processors upon expiration of a timer; and
receiving status reports from the plurality of processors regarding the transition from the first state to the second state in response to the polling.

10. The non-transitory computer-readable medium of claim 9, wherein the action time is based on a maximum manifest time received from the plurality of processors.

11. The non-transitory computer-readable medium of claim 9, wherein the action time is further based on a transport time, wherein the transport time corresponds to a period of time between dispatching the respective manifests to the plurality of processors and receiving the respective manifests by the plurality of processors.

12. The non-transitory computer-readable medium of claim 9, wherein the operations further comprise:

receiving an execution time associated with the transition identifier from each of the plurality of processors, wherein the execution time corresponds to a period of time approximated for executing the one or more operations associated with the transition identifier.

13. The non-transitory computer-readable medium of claim 12, wherein the action time is based on the execution time associated with a previous manifest dispatched to the plurality of processors.

14. The non-transitory computer-readable medium of claim 9, wherein the operations further comprise:

notifying the plurality of processors about the respective manifests before dispatching the respective manifests to the plurality of processors; and receiving a success indicator from the plurality of processors in response to notifying the plurality of processors about the respective manifests.

15. The non-transitory computer-readable medium of claim 12, wherein the operations further comprise setting the timer based on the action time and the execution time.

16. A device, comprising:

a memory; and a first system on a chip (SOC) having a first manifest server, the first manifest server configured to:

receive a request to transition the device from a first state to a second state;

receive, from each of a plurality of processors a manifest time associated with a transition identifier representing a command to transition from the first state to the second state, wherein the manifest time corresponds to an advance time required by the plurality of processors before executing one or more operations associated with the transition identifier;

compile a respective manifest for each of the plurality of processors of the device, wherein each manifest comprises the transition identifier and an action time for executing the one or more operations associated with the transition identifier, wherein the action time is based on the manifest time;

dispatch the respective manifests to the plurality of processors; and receive status reports from the plurality of processors regarding the transition from the first state to the second state.

17. The device of claim 16, wherein the action time is further based on a transport time, and wherein the transport time corresponds to a period of time between dispatching the respective manifests to the plurality of processors and receiving the respective manifests by the plurality of processors.

18. The device of claim 16, wherein the first manifest server is further configured to:

receive an execution time associated with the transition identifier from each of the plurality of processors, wherein the execution time corresponds to a period of time approximated for executing the one or more operations associated with the transition identifier.

19. The device of claim 18, wherein first manifest server is further configured to:

set a timer based on the action time and the execution time; and poll the plurality of processors upon expiration of the timer, wherein the status reports are received from the plurality of processors in response to the poll.

20. The device of claim 16, wherein the first manifest server is further configured to:

notify the plurality of processors about the respective manifests before dispatching the respective manifests to the plurality of processors; and receive a success indicator from the plurality of processors in response to notifying the plurality of processors about the respective manifests.

21. The device of claim 16, further comprising a second system on a chip (SOC), wherein the plurality of processors includes a first plurality of processors on the first SOC and a second plurality of processors on the second SOC.

22. The device of claim 21, further comprising a second manifest server on the second SOC.

23. The device of claim 22, wherein the first manifest server is configured to dispatch the respective manifests to the plurality of processors, in part, by dispatching the respective manifests of the second plurality of processors on the second SOC to the second plurality of processors on the second SOC via the second manifest server.

24. The device of claim 22, wherein the second manifest server is configured to, responsive to a determination that the first manifest server or the first SOC is unavailable:

compile, for a second transition from a third state to a fourth state, a respective manifest for each of the second plurality of processors of the device;

dispatch the respective manifests compiled by the second manifest server for the second transition to the second plurality of processors; and receive status reports from the second plurality of processors regarding the second transition from the third state to the fourth state.

25. The device of claim 24, wherein the fourth state comprises a pass-through video state in which only pass-through video and a notification are displayed by a display of the device.

* * * * *